(12) United States Patent
Miyata et al.

(10) Patent No.: US 10,826,346 B2
(45) Date of Patent: Nov. 3, 2020

(54) STATOR FOR ROTATING ELECTRICAL MACHINE AND ROTATING ELECTRICAL MACHINE

(71) Applicant: KABUSHIKI KAISHA TOYOTA JIDOSHOKKI, Kariya (JP)

(72) Inventors: Tomoaki Miyata, Kariya (JP); Shinichi Okuyama, Kariya (JP); Tatsuya Horiba, Kariya (JP); Taizo Hirano, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/365,916

(22) Filed: Mar. 27, 2019

(65) Prior Publication Data

US 2019/0305626 A1    Oct. 3, 2019

(30) Foreign Application Priority Data

Mar. 30, 2018    (JP) ................................ 2018-070057

(51) Int. Cl.
  *H02K 3/52*   (2006.01)
  *H02K 3/18*   (2006.01)
  *H02K 1/14*   (2006.01)

(52) U.S. Cl.
  CPC ............... *H02K 3/521* (2013.01); *H02K 1/14* (2013.01); *H02K 3/18* (2013.01)

(58) Field of Classification Search
  CPC .. H02K 3/52; H02K 1/14; H02K 3/18; H02K 3/522; H02K 3/521

USPC .................................................. 310/179–210
See application file for complete search history.

(56) References Cited

U.S. PATENT DOCUMENTS

| 2013/0200742 A1* | 8/2013 | Seki ....................... H02K 1/148 |
| | | 310/195 |
| 2014/0354094 A1* | 12/2014 | Yazaki ..................... H02K 3/28 |
| | | 310/71 |

FOREIGN PATENT DOCUMENTS

JP    2003-134716 A    5/2003

* cited by examiner

*Primary Examiner* — Naishadh N Desai
(74) *Attorney, Agent, or Firm* — Sughrue Mion, PLLC (57) ABSTRACT

A stator for a rotating electrical machine includes a stator core, two insulators, and conductive wires forming coils. At least one of the insulators includes guide grooves and through-grooves. The through-grooves include at least two first grooves each of which divides at least two of the guide grooves. Each of the first grooves has a recess that is recessed in the circumferential direction with respect to the rest of the first groove at a portion that divides one of the at least two guide grooves divided by the first groove. The conductive wires extending through the corresponding through-grooves and outward in the radial direction of the insulator base are guided in the circumferential direction by the corresponding guide grooves. The conductive wires extend through the recesses in the corresponding first grooves.

3 Claims, 5 Drawing Sheets

STATOR FOR ROTATING ELECTRICAL MACHINE AND ROTATING ELECTRICAL MACHINE

BACKGROUND

1. Field

The present disclosure relates to a stator for a rotating electrical machine and a rotating electrical machine.

2. Description of Related Art

A stator for a rotating electrical machine includes a stator core. The stator core has an annular yoke and multiple teeth extending radially from the inner circumferential surface of the yoke. As described in Japanese Laid-Open Patent Publication No. 2003-134716, one such stator includes insulators disposed on opposite axial end faces of the stator core. Each of the insulators has an annular insulator base and multiple insulator extending portions. The insulator base contacts the yoke in the axial direction of the stator core. The insulator extending portions extend radially from the inner circumferential surface of the insulator base and contact the teeth. Each of the teeth and the corresponding two insulator extending portions contacting the opposite end faces of the tooth form a set. The stator includes multiple coils, and each of the coils is formed by winding a conductive wire around the corresponding one of the aforementioned sets. The coils include U-phase, V-phase, and W-phase coils. The U-phase coils, the V-phase coils, and the W-phase coils are arranged adjacently in the circumferential direction of the stator core such that every third one of the coils in the circumferential direction of the stator core is of the same phase.

In the stator described in the aforementioned document, every two of the coils of the same phase that are closest to each other in the circumferential direction of the stator core are connected to each other by a connecting wire, which is a section of the conductive wire. Specifically, the opposite ends of the connecting wire extend from the two coils of the same phase to positions radially outward of the insulator base of one of the insulators. The connecting wire extends in the circumferential direction between the two coils of the same phase along the outer circumference of the insulator base.

The connecting wires of the three phases must be spaced apart and insulated from one another at positions radially outward of the insulator base. The insulator of the aforementioned document has multiple guide grooves and multiple through-grooves. The guide grooves are disposed in the outer circumferential surface of the insulator base and spaced apart in the axial direction and extend in the circumferential direction. The through-grooves are spaced apart in the circumferential direction and extend in directions crossing the guide grooves. Each of the through-grooves extends radially through the insulator base and opens in an end face of the insulator base. The conductive wire of each phase extends through the corresponding through-grooves and between the radially inner side and the radially outer side of the insulator base. The connecting wires of each of the phases are received in the corresponding one of the guide grooves and thus guided in the circumferential direction.

The connecting wires of the three phases are prevented from contacting each other by arranging the connecting wires of each phase in the corresponding guide groove.

The through-grooves and the guide grooves are effectively used not only when the connecting wires of the respective phases are routed, but also when a conductive wire extending toward a neutral point or a power supply terminal is routed.

Some of the through-grooves extend in a manner crossing and dividing at least two of the guide grooves. After being passed through one of such through-grooves, in a coil winding step, the connecting wire may be erroneously disposed in the incorrect one of the at least two of the guide grooves crossed by the through-groove, not the correct guide groove, in which the connecting wire should be arranged. In this case, the connecting wire may contact a connecting wire of a different phase. This problem may occur not only when the connecting wires are routed, but also when a conductive wire extending toward a neutral point or a power supply terminal is routed.

SUMMARY

Accordingly, it is an objective of the present disclosure to facilitate arranging a conductive wire in a correct guide groove in which the conductive wire should be disposed when the conductive wire is routed along an insulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a stator for a rotating electrical machine is provided that includes a stator, two insulators, and a plurality of conductive wires. The stator core has an annular yoke and a plurality of teeth extending in a radial direction from an inner circumferential surface of the yoke. The two insulators are disposed on opposite end faces in an axial direction of the stator core. Each of the insulators includes an annular insulator base that contacts the yoke and a plurality of insulator extending portions that extend in the radial direction from an inner circumferential surface of the insulator base and respectively contact the teeth. The insulator base has a first end face that contacts the yoke and a second end face opposite to the first end face in the axial direction. The conductive wires form a plurality of coils by being wound around the teeth and the insulator extending portions. At least one of the insulators includes a plurality of guide grooves and a plurality of through-grooves. The guide grooves extend in a circumferential direction in an outer circumferential surface of the insulator base and thus guide the corresponding conductive wires in the circumferential direction. The through-grooves that extend in the radial direction through the insulator base and open in the second end face of the insulator base in a manner dividing at least one of the guide grooves in the circumferential direction. The through-grooves include at least two first grooves each of which divides at least two of the guide grooves. Each of the first grooves has a recess that is recessed in the circumferential direction with respect to the rest of the first groove at a portion that divides one of the at least two guide grooves divided by the first groove. The conductive wires extending through the corresponding through-grooves and outward in the radial direction of the insulator base are guided in the circumferential direction by the corresponding guide grooves, and the conductive wires extend through the recesses in the corresponding first grooves.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A stator for a rotating electrical machine, a rotating electrical machine, and a method of manufacturing a stator for a rotating electrical machine according to an embodiment will now be described with reference to FIGS. 1 to 7

Figure 1:
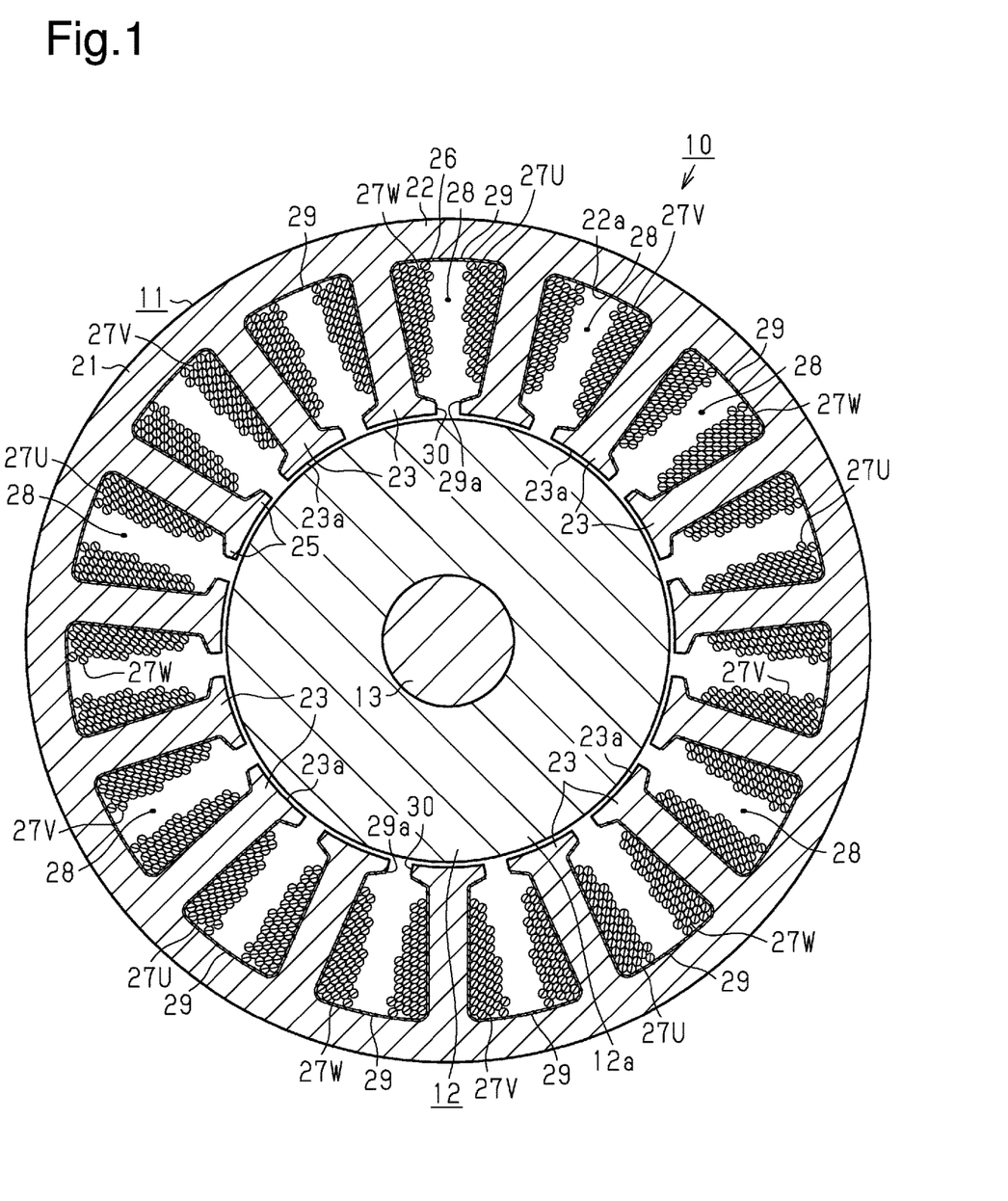
FIG. 1 is a cross-sectional view showing a rotating electrical machine according to an embodiment.

As illustrated in FIG. 1, a rotating electric machine 10 includes an annular stator 11, and a rotor 12 that is disposed inside the stator 11. The stator 11 surrounds the rotor 12. The rotor 12 is fixed to a rotating shaft 13 in a state where the rotating shaft 13 is inserted through the rotor 12, and rotates integrally with the rotating shaft 13. The rotor 12 has a rotor core 12a, which is fixedly attached to the rotating shaft 13.

Figure 2:
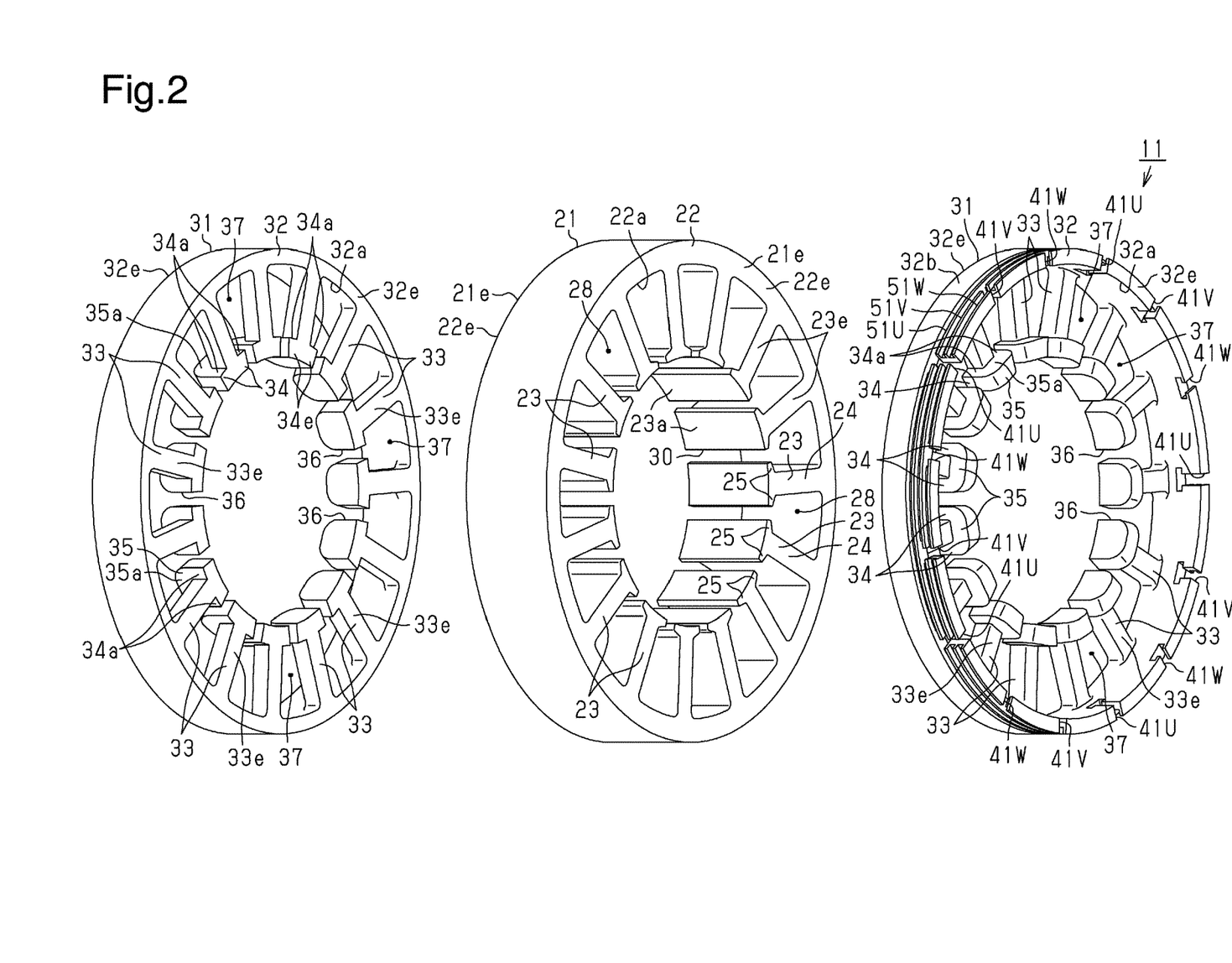
FIG. 2 is an exploded perspective view showing a stator core and insulators of the rotating electrical machine in FIG. 1.
Figure 3:
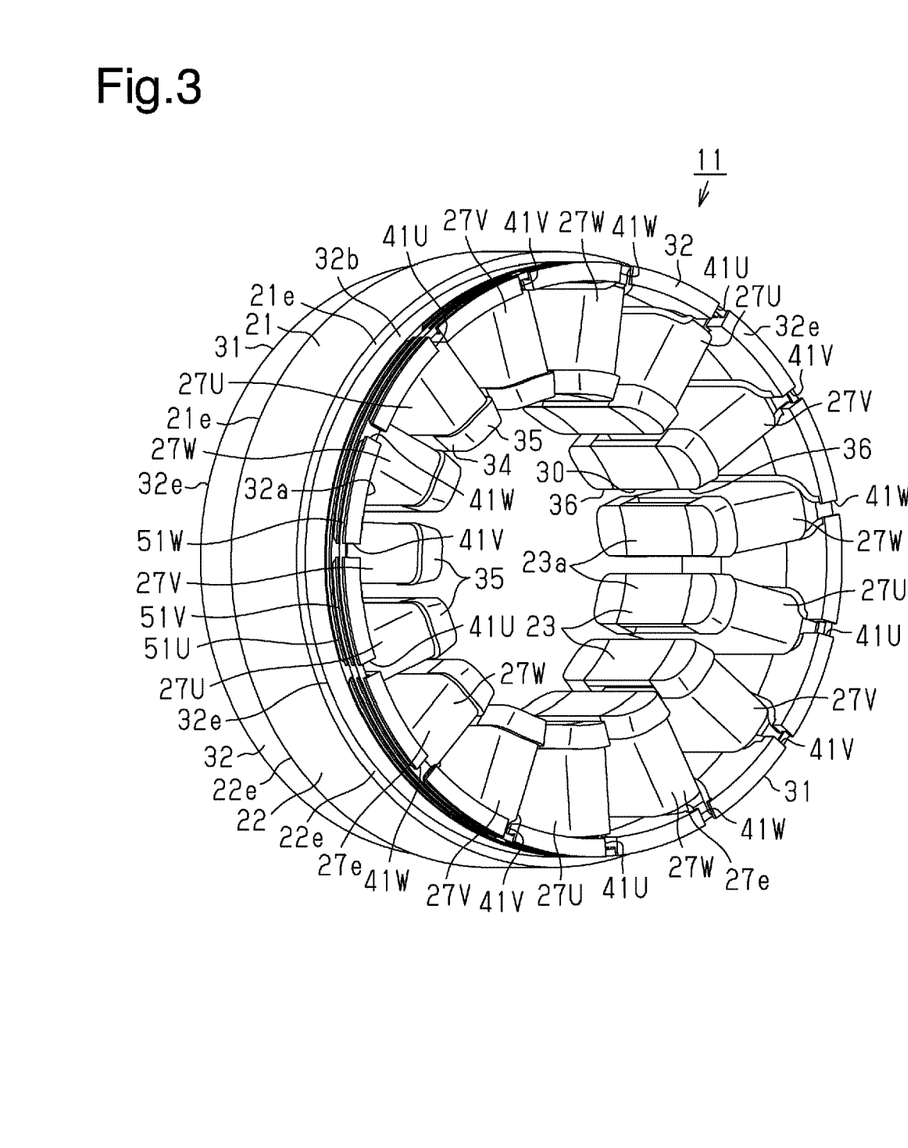
FIG. 3 is a perspective view showing the stator of the rotating electrical machine in FIG. 1.

As shown in FIGS. 2 and 3, the stator 11 includes an annular stator core 21. The stator core 21 has an annular yoke 22, and teeth 23 extending in the radial direction from an inner circumferential surface 22a of the yoke 22. In the present embodiment, fifteen teeth 23 extend from the inner circumferential surface 22a of the yoke 22. The teeth 23 are disposed at intervals in the circumferential direction of the stator core 21, and extend toward the axis of the stator core 21 from the inner circumferential surface 22a of the yoke 22. A distal end face of each of the teeth 23, that is, a surface 23a of the end on the opposite side from the yoke 22 has an arcuate shape that conforms to the outer circumferential surface of the rotor core 12a.

The stator core 21 has two end faces 21e at the opposite ends in the axial direction of the stator core 21. The yoke 22 has two end faces 22e at the opposite ends in the axial direction of the stator core 21, and the end faces 22e are flat surfaces. Each of the teeth 23 has two end faces 23e at the opposite ends in the axial direction of the stator core 21, and the end faces 23e are flat surfaces. The length of the yoke 22 in the axial direction of the stator core 21 and the length of each of the teeth 23 in the axial direction of the stator core 21 are the same. Therefore, each end face 22e of the yoke 22 and the corresponding end face 23e of each of the teeth 23 are located on the same plane. The opposite end faces 22e of the yoke 22 and the opposite end faces 23e of the teeth 23 form the opposite end faces 21e of the stator core 21.

Each of the teeth 23 has a tooth extending portion 24 that extends from the inner circumferential surface 22a of the yoke 22, and a pair of tooth flange portions 25 that protrude to the opposite sides in the circumferential direction of the stator core 21 from a distal end of the tooth extending portion 24, that is, the end on the opposite side from the yoke 22. The stator core 21 has slots 28, each of which is a space formed between two teeth 23 that are adjacent in the circumferential direction of the stator core 21. The gap between the two tooth flange portions 25 that face each other with each of the slots 28 therebetween is a slot opening 30.

As illustrated in FIG. 1, the stator 11 includes coils 27U of a U-phase, 27V of a V-phase, and 27W of a W-phase. A part of each of the coils 27U, 27V, and 27W extends through the slot 28. In the stator 11 of the present embodiment, the number of slots is fifteen.

The stator 11 includes slot insulating sheets 29 that are inserted into the respective slots 28. The slot insulating sheets 29 insulate the parts of each of the coils 27U, 27V, and 27W that extend through each of the slots 28 from the stator core 21. The slot insulating sheet 29 is in such a shape that an elongated band-shaped sheet is curved into a substantially U-shape along the inner surface of the slot 28.

The slot insulating sheet 29 extends along the yoke 22 and the teeth 23 that form the slot 28. Further, the slot insulating sheet 29 extends from one end in the axial direction of the stator core 21 to the other end. The opposite ends of the slot insulating sheet 29 face each other with a gap therebetween in a position corresponding to the slot opening 30 to form an opening 29a. The opening 29a extends from one end of the slot insulating sheet 29 to the other end in the axial direction of the stator core 21. Therefore, the opening 29a extends from one end in the axial direction of the stator core 21 to the other end.

As illustrated in FIGS. 2 and 3, the stator 11 includes annular insulators 31 that are respectively disposed on the opposite end faces 21e of the stator core 21. The respective insulators 31 are disposed on the end faces 21e of the stator core 21 in a state where axial directions of the respective insulators 31 correspond to the axial direction of the stator core 21. In the following explanation, an "axial direction", a "radial direction" and a "circumferential direction" means directions concerning the stator core 21 or the insulator 31 unless specially described otherwise.

Each of the insulators 31 has an annular insulator base 32, a plurality of insulator extending portions 33 extending in a radial direction from an inner circumferential surface 32a of the insulator base 32, and a pair of insulator flange portions 34 that protrude to the opposite sides in the circumferential direction from a distal end of each insulator extending portion 33, that is, the end on the opposite side from the insulator base 32.

The insulator base 32 is disposed in a position facing the yoke 22 in the axial direction. The opposite end faces 32e in the axial direction of the insulator base 32 are flat surfaces. A first end face 32e, which is one of the opposite end faces 32e of the insulator base 32, is in surface contact with the end face 22e of the yoke 22. Therefore, the insulator base 32 abuts on the yoke 22. The outside diameter of the insulator base 32 is smaller than the outside diameter of the yoke 22. The inside diameter of the insulator base 32 is the same as the inside diameter of the yoke 22.

The number of insulator extending portions 33 of each insulator 31 is the same as the number of tooth extending portions 24. The width in the circumferential direction in each of the insulator extending portions 33 is the same as the width in the circumferential direction in each of the tooth extending portions 24. The insulator extending portions 33 are disposed at intervals in the circumferential direction, and extend toward the axis of the insulator base 32 from the inner circumferential surface 32a of the insulator base 32.

The insulator extending portions 33 are disposed in positions facing the tooth extending portions 24 in the axial direction. Each of the insulator extending portions 33 is a columnar body that protrudes from a spot close to the first end face 32e on the inner circumferential surface 32a of the insulator base 32. The opposite end faces 33e in the axial direction of each of the insulator extending portions 33 are flat surfaces. A first end face 33e, which is one of the opposite end faces 33e of each of the insulator extending portions 33, is located on the same plane as the first end face 32e of the insulator base 32.

Each of the insulator flange portions 34 has a flat end face 34e which is located on the same plane as the first end face 33e of each of the insulator extending portions 33. The first end face 33e of each of the insulator extending portions 33 and the end face 34e of each of the insulator flange portions 34 are in surface contact with the end face 23e of each of the teeth 23. Therefore, each of the insulator extending portions 33 abuts on the corresponding one of the teeth 23.

Further, each of the insulators 31 has an overhanging wall 35 that overhangs in the axial direction to an opposite side to the first end face 33e of the insulator extending portion 33 from the distal end of each of the insulator extending portions 33. Each of the overhanging walls 35 connects to the two insulator flange portions 34 which protrude to the opposite sides in the circumferential direction from the distal end of each of the insulator extending portions 33. The width in the circumferential direction in each of the overhanging walls 35 is the same as the total width in the circumferential direction in the two insulator flange portions 34 that protrude to the opposite sides in the circumferential direction from the distal end of each of the insulator extending portions 33. Therefore, edge portions on the opposite sides in the circumferential direction of each of the overhanging walls 35 connect to edge portions of the two insulator flange portions 34. Each of the insulator flange portions 34 and each of the overhanging walls 35 respectively have surfaces that face the insulator base 32, that is, surfaces 34a and 35a that face an outside in the radial direction, and these surfaces 34a and 35a are located on the same plane.

Each of the insulators 31 has openings 36 each of which is a gap between two insulator flange portions 34 adjacent to each other in the circumferential direction, and a gap between two overhanging walls 35 adjacent to each other in the circumferential direction. The openings 36 of each of the insulators 31 are disposed in the same positions in the circumferential direction as positions of the slot openings 30 of the stator core 21.

As illustrated in FIG. 3, each of the coils 27U, 27V, and 27W has two coil ends 27e that protrude in the axial direction respectively from the opposite end faces 21e of the stator core 21. Each of the insulators 31 has coil insertion spaces 37 (refer to FIG. 2) each of which is formed between the two insulator extending portions 33 that are adjacent to each other in the circumferential direction. Each of the coil ends 27e extends through the coil insertion space 37. Further, each of the insulators 31 has spaces each of which is defined by the inner circumferential surface 32a of the insulator base 32, each of the overhanging walls 35 and the second end face 33e of each of the insulator extending portions 33, and each of the coil ends 27e extends through the space.

Each of the coil ends 27e is restricted from moving outward in the radial direction by contacting the insulator base 32. Further, each of the coil ends 27e is restricted from moving inward in the radial direction by contacting the surfaces 34a of the two insulator flange portions 34 and the surface 35a of the overhanging wall 35. The coil ends 27e are insulated from the teeth 23 by the insulator extending portions 33.

To form each of the coils 27U, 27V, 27W, a conductive wire feeding nozzle (not shown) for the corresponding phase is passed through corresponding openings 36 in the insulator 31, corresponding slot openings 30 in the stator core 21, and corresponding openings 29a in the slot insulating sheet 29. In this manner, the conductive wire 26 is wound by concentrated winding around each corresponding set of the tooth extending portion 24 and the two insulator extending portions 33 located on the opposite axial sides of the tooth extending portion 24, thus forming the coil 27U, 27V, 27W. Hereinafter, for illustrative purposes, winding the conductive wire 26 around each set of the tooth extending portion 24 and the associated two insulator extending portions 33 will be referred to simply as "winding the conductive wire 26 around the tooth 23". The conductive wire 26 for forming the U-phase coils 27U, the conductive wire 26 for forming the V-phase coils 27V, and the conductive wire 26 for forming the W-phase coils 27W will be referred to as the U-phase conductive wire 26, the V-phase conductive wire 26, and the W-phase conductive wire 26, respectively.

As shown in FIG. 3, the coils 27U, 27V, 27W are arranged such that every third one of the coils 27U, 27V, 27W is of the same phase in the circumferential direction. Each of the coils 27U, 27V, 27W and a circumferentially adjacent one of the coils 27U, 27V, 27W are of different phases.

With reference to FIG. 2, one of the two insulators 31 has multiple through-grooves (or recesses), which are first through-grooves (or first recesses) 41U, second through-grooves (or second recesses) 41V, and third through-grooves (or third recesses) 41W. The conductive wires 26 can be passed through the first to third through-grooves 41U, 41V, 41W. Specifically, five first through-grooves 41U, five second through-grooves 41V, and five third through-grooves 41W are disposed and spaced apart in the circumferential direction. The first to third through-grooves 41U, 41V, 41W extend in the axial direction from the second end face 32e of the insulator base 32 and radially through the insulator base 32.

An outer circumferential surface 32b of the insulator base 32 has U-phase, V-phase, and W-phase guide grooves, which are a first guide groove 51U, a second guide groove 51V, and a third guide groove 51W. The first, second, and third guide grooves 51U, 51V, 51W guide the corresponding U-phase, V-phase, and W-phase conductive wires 26 in the circumferential direction. The first to third guide grooves 51U, 51V, 51W extend over the entire outer circumferential surface 32b of the insulator base 32. The first to third guide grooves 51U, 51V, 51W are arranged in the axial direction on the outer circumferential surface 32b of the insulator base 32, without extending through the insulator base 32.

As the insulator base 32 is viewed from side, the first to third guide grooves 51U, 51V, 51W extend parallel to one another. The first guide groove 51U is spaced in the axial direction from the second end face 32e of the insulator base 32, compared to the second and third guide grooves 51V, 51W. The second guide groove 51V is spaced in the axial direction from the second end face 32e of the insulator base 32, compared to the third guide groove 51W.

Figure 4:
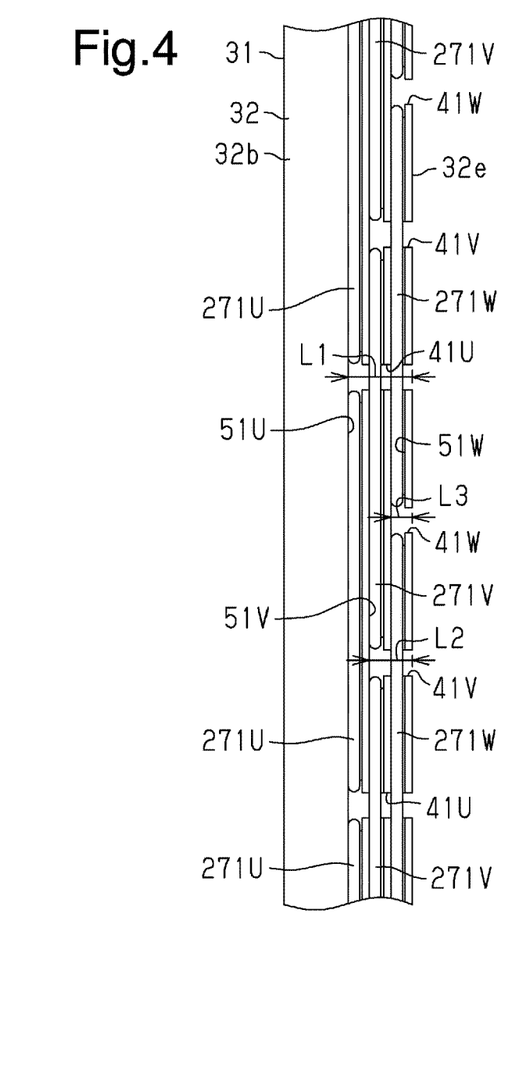
FIG. 4 is a diagram schematically showing an insulator and a conductive wire of the stator in FIG. 3.

As illustrated in FIG. 4, the first, second, and third through-grooves 41U, 41V, 41W have different lengths (depths) L1, L2, and L3, respectively, from the second end face 32e of the insulator base 32. The length L1 of each first through-groove 41U is greater than the lengths L2 and L3 of the second and third through-grooves 41V, 41W. The length L2 of each second through-groove 41V is greater than the length L3 of each third through-groove 41W. Each first through-groove 41U is disposed between the second and third through-grooves 41V, 41W in the circumferential direction. Each second through-groove 41V is arranged between the first and third through-grooves 41U, 41W in the circumferential direction. Each third through-groove 41W is located between the first and third through-grooves 41U, 41V in the circumferential direction.

As shown in FIG. 2, the distance between every adjacent two of the through-grooves 41U, 41V, 41W in the circumferential direction is equal to the distance between every adjacent two of the insulator extending portions 33 in the circumferential direction. The positions of the through-grooves 41U, 41V, 41W coincide with the positions of the corresponding insulator extending portions 33 in the circumferential direction.

Figure 5A:
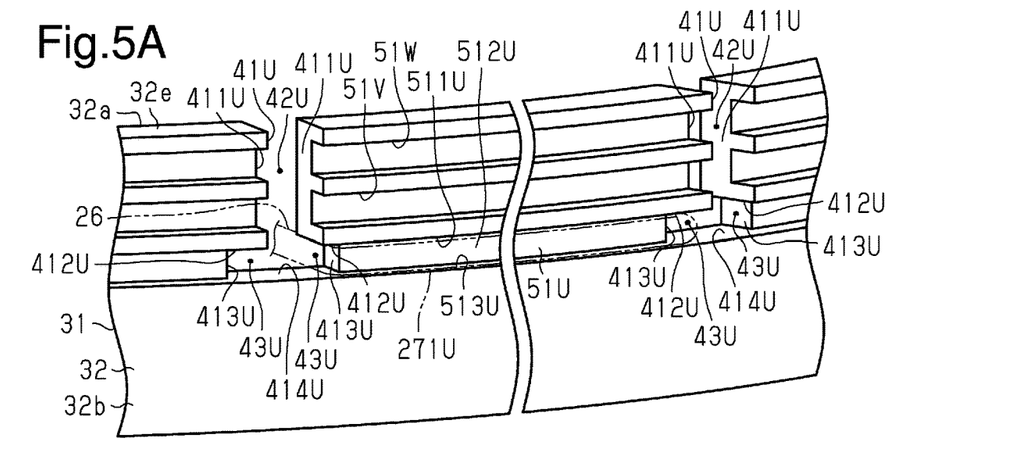
FIGS. 5A, 5B, and 5C are perspective views each showing a section of the insulator.

With reference to FIG. 5A, each of the first through-grooves 41U has a straight groove 42U and two extending grooves 43U. The straight groove 42U extends in the axial direction from the second end face 32e of the insulator base 32. The extending grooves 43U extend from the straight groove 42U to the opposite sides in the circumferential direction.

Each first through-groove 41U is defined by two first side surfaces 411U, two stepped surfaces 412U, two second side surfaces 413U, and a bottom surface 414U. The first side surfaces 411U are flat and face each other, extending parallel to each other in the axial direction from the second end face 32e of the insulator base 32. The stepped surfaces 412U are flat and extend from the edges of the associated first side surfaces 411U in circumferential directions separating from each other. The second side surfaces 413U are flat and face each other, extending parallel to each other in the axial direction from the edges of the associated stepped surfaces 412U. The bottom surface 414U is flat and extends in the circumferential direction, thus joining the edges of the second side surfaces 413U to each other.

The straight groove 42U of each first through-groove 41U is defined by the first side surfaces 411U and a section of the bottom surface 414U. The section of the bottom surface 414U corresponds to the section of the bottom surface 414U other than the sections facing the stepped surfaces 412U. Each of the extending grooves 43U of the first through-groove 41U is defined by the corresponding one of the stepped surfaces 412U, the associated one of the second side surfaces 413U, and the section of the bottom surface 414U facing the associated stepped surface 412U. The two extending grooves 43U extend from the end of the straight groove 42U to the opposite sides in the circumferential direction.

The first side surfaces 411U extend in the axial direction from the second end face 32e of the insulator base 32 in a manner crossing the second and third guide grooves 51V, 51W. The straight groove 42U of each first through-groove 41U thus extend in the axial direction from the second end face 32e of the insulator base 32 in a manner crossing the second and third guide grooves 51V, 51W, thus communicating with the second and third guide grooves 51V, 51W.

The first guide groove 51U is defined by two side surfaces 511U, 513U and a bottom surface 512U. The side surfaces 511U, 513U face each other in the axial direction. The bottom surface 512U connects the side surfaces 511U, 513U to each other. The side surface 511U is located closer in the axial direction to the second end face 32e of the insulator base 32 than the side surface 513U. The stepped surfaces 412U are continuous with and flush with the side surface 511U of the first guide groove 51U. The second side surfaces 413U are continuous with and perpendicular to the bottom surface 512U of the first guide groove 51U. The bottom surface 414U is continuous with and flushes with the side surface 513U of the first guide groove 51U. The two extending grooves 43U of each first through-groove 41U thus communicate with the first guide groove 51U. As a result, each first through-groove 41U communicates with all of the first to third guide grooves 51U, 51V, 51W.

The first through-grooves 41U extend radially through the insulator base 32 and open in the second end face 32e of the insulator base 32 in a manner dividing the first to third guide grooves 51U, 51V, 51W in the circumferential direction. In each first through-groove 41U, the first side surfaces 411U and the second side surfaces 413U form two dividing surfaces that are spaced apart in the circumferential direction in a manner dividing the first to third guide grooves 51U, 51V, 51W. Each of the dividing surfaces has a section recessed in the circumferential direction with respect to the portion that divides the second and third guide grooves 51V, 51W. Specifically, the portion of each dividing surface that divides the first guide groove 51U (the second side surface 413U) is recessed in the circumferential direction with respect to the portion dividing the second and third guide grooves 51V, 51W. In other words, a certain portion of the first through-groove 41U (the portion dividing the first guide groove 51U) is recessed to the opposite sides in the circumferential direction with respect to the portion that divides the second and third guide grooves 51V, 51W. That is, each first through-groove 41U divides the three guide grooves 51U, 51V, 51W and is enlarged in the circumferential direction at the portion that divides the first guide groove 51U, compared to the rest of the first through-groove 41U. The first through-groove 41U corresponds to a first groove that divides at least two of the guide grooves. The extending grooves 43U each correspond to a recess that is recessed in the circumferential direction compared to the rest of the first through-groove 41U.

Figure 5B:
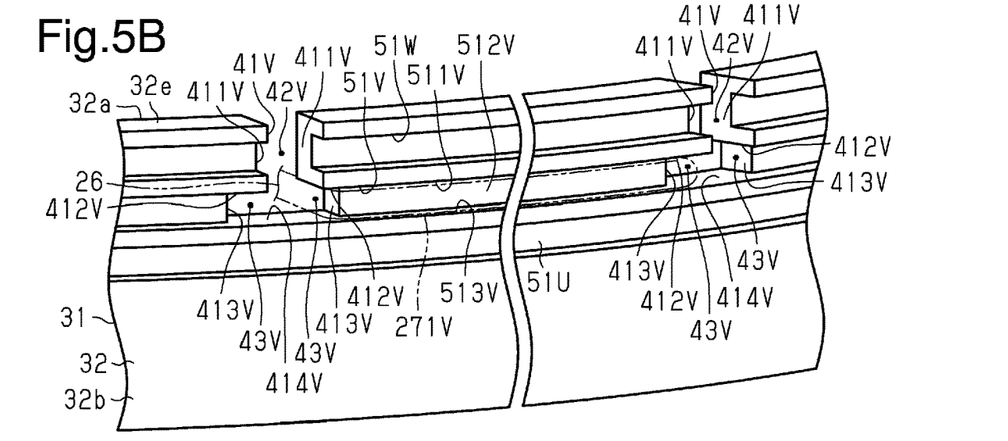

As shown in FIG. 5B, each of the second through-grooves 41V has a straight groove 42V and two extending grooves 43V. The straight groove 42V extend in the axial direction from the second end face 32e of the insulator base 32. The extending grooves 43V extend from the straight groove 42V to the opposite sides in the circumferential direction.

Each second through-groove 41V is defined by two first side surfaces 411V, two stepped surfaces 412V, two second side surfaces 413V, and a bottom surface 414V. The first side surfaces 411V are flat and face each other, extending parallel to each other in the axial direction from the second end face 32e of the insulator base 32. The stepped surfaces 412V are flat and extend from the edges of the associated first side surfaces 411V in circumferential directions separating from each other. The second side surfaces 413V are flat and face each other, extending parallel to each other in the axial direction from the edges of the associated stepped surfaces 412V. The bottom surface 414V is flat and extends in the circumferential direction, thus joining the edges of the second side surfaces 413V to each other.

The straight groove 42V of each second through-groove 41V is defined by the first side surfaces 411V and a section of the bottom surface 414V. The section of the bottom surface 414V corresponds to the section of the bottom surface 414V other than the sections facing the stepped surfaces 412V. Each of the extending grooves 43V of the second through-groove 41V is defined by the corresponding one of the stepped surfaces 412V, the associated one of the second side surfaces 413V, and the section of the bottom surface 414V facing the associated stepped surface 412V. The two extending grooves 43V extend from the end of the straight groove 42U to the opposite sides in the circumferential direction.

The two first side surfaces 411V extend in the axial direction from the second end face 32e of the insulator base 32 in a manner crossing the third guide groove 51W. The straight groove 42V of each second through-groove 41V thus extend in the axial direction from the second end face 32e of the insulator base 32 in a manner crossing the third guide groove 51W, thus communicating with the third guide groove 51W. The second guide groove 51V is defined by two side surfaces 511V, 513V and a bottom surface 512V. The side surfaces 511V, 513V face each other in the axial direction. The bottom surface 512V connects the side surfaces 511V, 513V to each other. The side surface 511V is located closer in the axial direction to the second end face 32e of the insulator base 32 than the side surface 513V. The stepped surfaces 412V are continuous with and flush with the side surface 511V of the second guide groove 51V. The second side surfaces 413V are continuous with and perpendicular to the bottom surface 512V of the second guide groove 51V. The bottom surface 414V is continuous with and flushes with the side surface 513V of the second guide groove 51V. The two extending grooves 43V of each second through-groove 41V thus communicate with the second guide groove 51V. As a result, each second through-groove 41V communicates with the second and third guide grooves 51V, 51W.

The second through-grooves 41V extend radially through the insulator base 32 and open in the second end face 32e of the insulator base 32 in a manner dividing the second and third guide grooves 51V, 51W in the circumferential direction. In each second through-groove 41V, the first side surfaces 411V and the second side surfaces 413V form two dividing surfaces that are spaced apart in the circumferential direction in a manner dividing the second and third guide grooves 51V, 51W. Each of the dividing surfaces has a section recessed in the circumferential direction with respect to the portion that divides the third guide groove 51W. Specifically, the portion of each dividing surface that divides the second guide groove 51V (the second side surface 413V) is recessed in the circumferential direction with respect to the portion dividing the third guide groove 51W. In other words, a certain portion of the second through-groove 41V (the portion dividing the second guide groove 51V) is recessed to the opposite sides in the circumferential direction with respect to the portion that divides the third guide groove 51W. That is, each second through-groove 41V divides the two guide grooves 51V, 51W and is enlarged in the circumferential direction at the portion that divides the guide groove 51V, compared to the rest of the second through-groove 41V. The second through-groove 41V corresponds to the first groove that divides at least two of the guide grooves. The extending grooves 43V each correspond to a recess that is recessed in the circumferential direction compared to the rest of the second through-groove 41V.

Figure 5C:
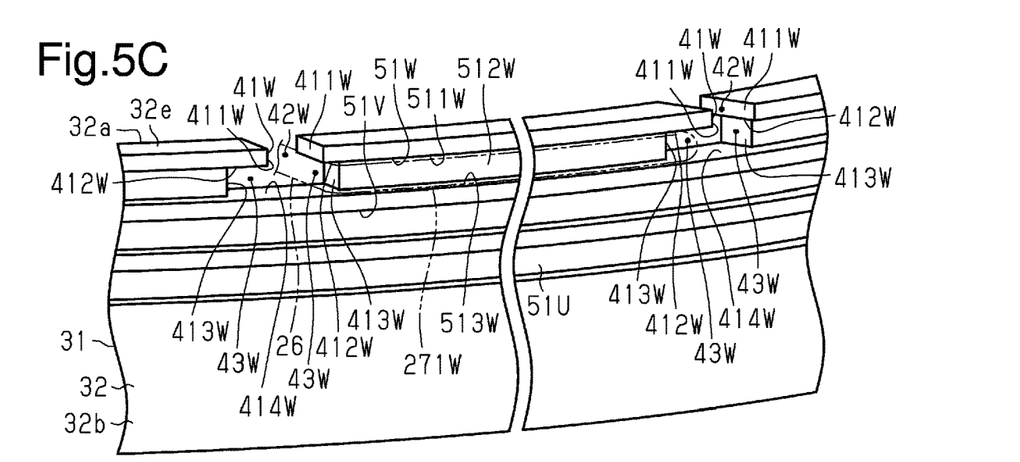

Referring to FIG. 5C, each of the third through-grooves 41W has a straight groove 42W and two extending grooves 43W. The straight groove 42W extends in the axial direction from the second end face 32e of the insulator base 32. The extending grooves 43W extend from the straight groove 42W to the opposite sides in the circumferential direction.

Each third through-groove 41W is defined by two first side surfaces 411W, two stepped surfaces 412W, two second side surfaces 413W, and a bottom surface 414W. The first side surfaces 411W are flat and face each other, extending parallel to each other in the axial direction from the second end face 32e of the insulator base 32. The stepped surfaces 412W are flat and extend from the edges of the associated first side surfaces 411W in circumferential directions separating from each other. The second side surfaces 413W are flat and face each other, extending parallel to each other in the axial direction from the edges of the associated stepped surfaces 412W. The bottom surface 414W is flat and extends in the circumferential direction, thus joining the edges of the second side surfaces 413W to each other.

The straight groove 42W of each third through-groove 41W is defined by the first side surfaces 411W and a section of the bottom surface 414W. The section of the bottom surface 414W corresponds to the section of the bottom surface 414W other than the sections facing the stepped surfaces 412W. Each of the extending grooves 43W of the third through-groove 41W is defined by the corresponding one of the stepped surfaces 412W, the associated one of the second side surfaces 413W, and the section of the bottom surface 414W facing the associated stepped surface 412W. The two extending grooves 43W extend from the end of the straight groove 42W to the opposite sides in the circumferential direction.

The third guide groove 51W is defined by two side surfaces 511W, 513W and a bottom surface 512W. The side surfaces 511W, 513W face each other in the axial direction. The bottom surface 512W connects the side surfaces 511W, 513W to each other. The side surface 511W is located closer in the axial direction to the second end face 32e of the insulator base 32 than the side surface 513W. The stepped surfaces 412W are continuous with and flush with the side surface 511W of the third guide groove 51W. The second side surfaces 413W are continuous with and perpendicular to the bottom surface 512W of the third guide groove 51W. The bottom surface 414W is continuous with and flushes with the side surface 513W of the third guide groove 51W. The two extending grooves 43W of each third through-groove 41W thus communicate with the third guide groove 51W. As a result, each third through-groove 41W communicates with the third guide groove 51W.

The third through-grooves 41W extend radially through the insulator base 32 and open in the second end face 32e of the insulator base 32 in a manner dividing the third guide groove 51W in the circumferential direction. In each third through-groove 41W, the first side surfaces 411W and the second side surfaces 413W form two dividing surfaces that are spaced apart in the circumferential direction in a manner dividing the third guide groove 51W. Each of the dividing surfaces has a section recessed in the circumferential direction with respect to the portion that divides the third guide groove 51W. Specifically, the portion of each dividing surface that divides the third guide groove 51V (the second side surface 413W) is recessed in the circumferential direction with respect to the rest of the dividing surface (the first side surface 411W). In other words, the portion of each third through-groove 41W dividing the third guide groove 51V (the second side surfaces 413W) is recessed to the opposite sides in the circumferential direction with respect to the rest of the third through-groove 41W. That is, the third through-groove 41W is enlarged in the circumferential direction at the portion that corresponds to the guide groove 51W, which is divided by the third through-groove 41W, compared to the rest of the third through-groove 41W. The extending grooves 43W each correspond to a recess that is recessed in the circumferential direction compared to the rest of the third through-groove 41W.

As illustrated in FIG. 5A, after being wound around a corresponding one of the teeth 23 and forming the U-phase coil 27U, the U-phase conductive wire 26 extending from the winding-end section of the U-phase coil 27U is routed radially outward with respect to the insulator base 32 through the corresponding first through-groove 41U. The conductive wire 26 is then moved along the corresponding one of the two first side surfaces 411U of the straight groove 42U toward the associated extending groove 43U and is engaged with the second side surface 413U. Subsequently, the conductive wire 26 is folded toward the first guide groove 51U at the corner portion between the second side surface 413U and the bottom surface 512U of the first guide groove 51U and received in the first guide groove 51U. The conductive wire 26 thus extends in the circumferential direction in the first guide groove 51U on the radially outer side of the insulator base 32. The conductive wire 26 is then routed through the circumferentially adjacent one of the first through-grooves 41U, extending toward the adjacent tooth 23. That is, after passing through the first through-groove 41U and being thus guided to the radially outer side of the insulator base 32, the U-phase conductive wire 26 is guided by the first guide groove 51U in the circumferential direction. The conductive wire 26 is passed through the circumferentially recessed section of the first through-groove 41U and extending between the radially outer side and the radially inner side of the insulator base 32.

Then, the U-phase conductive wire 26 is wound around the adjacent tooth 23 and forms the adjacent U-phase coil 27U. By repeating such operation, the U-phase coils 27U are formed such that every third one of the coils 27 is of U phase in the circumferential direction. That is, the U-phase conductive wire 26 is routed into and out of the respective first through-grooves 41U. The U-phase coils 27U are provided by series winding. The sections of the U-phase conductive wire 26 received in the first guide groove 51U are U-phase connecting wires 271U. Each of the U-phase connecting wires 271U connects the corresponding adjacent two of the U-phase coils 27U in the circumferential direction. Each first through-groove 41U is recessed to the opposite sides in the circumferential direction at the position corresponding to the first guide groove 51U in which the corresponding U-phase connecting wire 271U should be disposed, not the second or third guide groove 51V, 51W. Each of the U-phase connecting wires 271U passes through the corresponding two of the first through-grooves 41U and extends along the section of the first guide groove 51U between these first through-grooves 41U. In this manner, the U-phase connecting wires 271U are engaged with the outer circumferential surface 32b of the insulator base 32. Also, each U-phase connecting wire 271U is passed through the corresponding circumferentially recessed portion of the associated first through-groove 41U.

With reference to FIG. 5B, after being wound around the corresponding one of the teeth 23 and forming the V-phase coil 27V, the V-phase conductive wire 26 extending from the winding-end section of the V-phase coil 27V is routed radially outward with respect to the insulator base 32 through the corresponding second through-groove 41V. The conductive wire 26 is then moved along the corresponding one of the two first side surfaces 411V of the straight groove 42V toward the associated extending groove 43V and is engaged with the second side surface 413V. Subsequently, the conductive wire 26 is folded toward the second guide groove 51V at the corner portion between the second side surface 413V and the bottom surface 512V of the second guide groove 51V and received in the second guide groove 51V. The conductive wire 26 thus extends in the circumferential direction in the second guide groove 51V on the radially outer side of the insulator base 32. The conductive wire 26 is then routed through the circumferentially adjacent one of the second through-grooves 41V, extending toward the adjacent tooth 23. That is, after passing through the second through-groove 41V and being thus guided to the radially outer side of the insulator base 32, the V-phase conductive wire 26 is guided by the second guide groove 51V in the circumferential direction. The conductive wire 26 is passed through the circumferentially recessed section of the second through-groove 41V and extending between the radially outer side and the radially inner side of the insulator base 32.

Then, the V-phase conductive wire 26 is wound around the adjacent tooth 23 and forms the adjacent V-phase coil 27V. By repeating such operation, the V-phase coils 27V are formed such that every third one of the coils 27 is of V phase in the circumferential direction. That is, the V-phase conductive wire 26 is routed into and out of the respective second through-grooves 41V. The V-phase coils 27V are provided by series winding. The sections of the V-phase conductive wire 26 received in the second guide groove 51V are V-phase connecting wires 271V. Each of the V-phase connecting wires 271V connects the corresponding adjacent two of the V-phase coils 27V in the circumferential direction. Each second through-groove 41V is recessed to the opposite sides in the circumferential direction at the position corresponding to the second guide groove 51V in which the corresponding V-phase connecting wire 271V should be disposed, not the first or third guide groove 51U, 51W. Each of the V-phase connecting wires 271V passes through the corresponding two of the second through-grooves 41V and extends along the section of the second guide groove 51V between these second through-grooves 41V. In this manner, the V-phase connecting wires 271V are engaged with the outer circumferential surface 32b of the insulator base 32. Also, each V-phase connecting wire 271V is passed through the corresponding circumferentially recessed portion of the associated second through-groove 41V.

As illustrated in FIG. 5C, after being wound around the corresponding one of the teeth 23 and forming the W-phase coil 27W, the W-phase conductive wire 26 extending from the winding-end section of the W-phase coil 27W is routed radially outward with respect to the insulator base 32 through the corresponding third through-groove 41W. The conductive wire 26 is then moved along the corresponding one of the two first side surfaces 411W of the straight groove 42W toward the associated extending groove 43W and is engaged with the second side surface 413W. Subsequently, the conductive wire 26 is folded toward the third guide groove 51W at the corner portion between the second side surface 413W and the bottom surface 512W of the third guide groove 51W and received in the third guide groove 51W. The conductive wire 26 thus extends in the circumferential direction in the third guide groove 51W on the radially outer side of the insulator base 32. The conductive wire 26 is then routed through the circumferentially adjacent one of the third through-grooves 41W, extending toward the adjacent tooth 23. That is, after passing through the third through-groove 41W and being thus guided to the radially outer side of the insulator base 32, the W-phase conductive wire 26 is guided by the third guide groove 51W in the circumferential direction. The conductive wire 26 is passed through the circumferentially recessed section of the third through-groove 41W and extending between the radially outer side and the radially inner side of the insulator base 32.

Then, the W-phase conductive wire 26 is wound around the adjacent tooth 23 and forms the adjacent W-phase coil 27W. By repeating such operation, the W-phase coils 27W are formed such that every third one of the coils 27 is of W phase in the circumferential direction. That is, the W-phase conductive wire 26 is routed into and out of the respective third through-grooves 41W. The W-phase coils 27W are provided by series winding. The sections of the W-phase conductive wire 26 received in the third guide groove 51W are W-phase connecting wires 271W. Each of the W-phase connecting wires 271W connects the corresponding adjacent two of the W-phase coils 27W in the circumferential direction. Each third through-groove 41W is recessed to the opposite sides in the circumferential direction at the position corresponding to the third guide groove 51W in which the corresponding W-phase connecting wire 271W should be disposed, not the first or second guide groove 51U, 51V. Each of the W-phase connecting wires 271W passes through the corresponding two of the third through-grooves 41W and extends along the section of the third guide groove 51W between these third through-grooves 41W. In this manner, the W-phase connecting wires 271W are engaged with the outer circumferential surface 32b of the insulator base 32. Also, each W-phase connecting wire 271W is passed through the corresponding circumferentially recessed portion of the associated third through-groove 41W.

The winding-start sections of the conductive wires 26 of the three phases are each electrically connected to a non-illustrated corresponding power supply terminal. The winding-end sections of the conductive wires 26 are electrically connected to one another at a non-illustrated neutral-point-joining section. As electric currents run through the coils 27U, 27V, 27V of the respective phases, the rotor 12 and the rotating shaft 13 rotate integrally with each other.

An operation of the present embodiment will now be described.

Each first through-groove 41U communicates with all of the first to third guide grooves 51U, 51V, 51W. The conductive wire 26 forming the U-phase connecting wires 271U is, however, passed through the corresponding recessed portion of the first through-groove 41U and guided radially outward with respect to the insulator base 32. The conductive wire 26 is thus disposed correctly in the first guide groove 51U in which the conductive wire 26 should be arranged. Each second through-groove 41V communicates with the second and third guide grooves 51V, 51W. The conductive wire 26 forming the V-phase connecting wires 271V is, however, passed through the corresponding recessed portion of the second through-groove 41V and guided radially outward with respect to the insulator base 32. The conductive wire 26 is thus disposed correctly in the second guide groove 51V in which the conductive wire 26 should be arranged.

The connecting wires 271U, 271V, 271W of the respective phases are received in the corresponding guide grooves 51U, 51V, 51W. Contact of any of the connecting wires 271U, 271V, 271W between different phases is thus unlikely to happen. This ensures insulation in the connecting wires 271U, 271V, 271W between different phases on the radially outer side of the insulator base 32.

The above-described embodiment has the following advantages.

(1) Each of the first and second through-grooves 41U, 41V communicates with at least two of the guide grooves 51U, 51V, 51W. However, the U-phase and V-phase conductive wires 26 are each passed through the corresponding recessed portion of each corresponding through-groove 41U, 41V and thus guided to the radially outer side of the insulator base 32. In this manner, the conductive wires 26 are correctly disposed in the corresponding guide grooves 51U, 51V in which the conductive wires 26 should be arranged. As a result, arranging each conductive wire 26 in an incorrect one of the guide grooves, not the correct guide groove 51U, 51V, is avoided. This facilitates correctly arranging the conductive wires 26 in the corresponding guide grooves 51U, 51V, 51W, in which the conductive wires 26 should be disposed, when the conductive wires 26 are routed along the insulator 31. This advantage is also ensured for not only the connecting wires 271U, 271V, 271W but also the conductive wire sections connected to the power supply terminals or the neutral-point-joining section.

(2) Each of the U-phase connecting wires 271U is passed through the corresponding two of the first through-grooves 41U and extending along the section of the first guide groove 51U between these first through-grooves 41U. The U-phase connecting wires 271U are thus engaged with the outer circumferential surface of the insulator base 32. Particularly, the U-phase connecting wires 271U are passed through the corresponding recessed portions of the first through-grooves 41U. The second and third connecting wires 271V, 271W are installed in the same manner as the U-phase connecting wires 271U. Each of the connecting wires 271U, 271V, 271W is one of the sections of the associated conductive wire 26 that connects the coils 27U, 27V, 27W of the same phase. Routing the connecting wires 271U, 271V, 271W is thus particularly complicated. Therefore, if the guide grooves 51U, 51V, 51W are not configured in the same manner as in the present embodiment, erroneous arrangement of the connecting wires 271U, 271V, 271W in the guide grooves 51U, 51V, 51W tends to occur. In the present embodiment, such erroneous arrangement is effectively hampered.

(3) Each of the through-grooves 41U, 41V, 41W is recessed to the opposite sides in the circumferential direction at the portion that divides the corresponding one of the guide grooves 51U, 51V, 51W. In this configuration, which of the circumferential sides of the insulator base 32 each conductive wire 26 should extend from the corresponding through-groove 41U, 41V, 41W can be determined as needed. This improves flexibility for routing the conductive wires 26.

The above-described embodiment may be modified as follows.

Figure 6A:
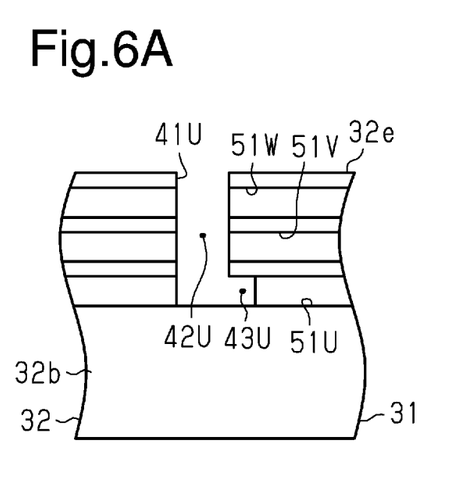
FIGS. 6A and 6B are views each showing a through-groove according to another embodiment.
Figure 6B:
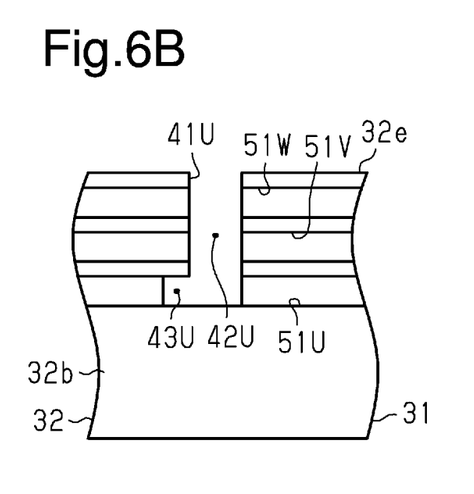

Referring to FIGS. 6A and 6B, each first through-groove 41U may be recessed to only one of the opposite sides in the circumferential direction at the portion that divides the first guide groove 51U. The first through-grooves 41U of the insulator 31 may include those configured as illustrated in at least one of FIGS. 6A and 6B, in addition to the first through-grooves 41U configured as shown in FIG. 5A. The second and third through-grooves 41U, 41W may be modified in the same manner as the first through-grooves 41U. That is, the through-grooves 41U, 41V, 41W may be configured in any suitable manner as long as each through-groove 41U, 41V, 41W is recessed to at least one of the opposite sides in the circumferential direction at the portion that divides the corresponding guide groove 51U, 51V, 51W.

The guide grooves may be partitioned by multiple projections projecting from the outer circumferential surface 32b of the insulator base 32 and arranged in the circumferential direction and in the axial direction.

The lengths (depths) L2, L3 of the second and third through-grooves 41V, 41W from the second end face 32e of the insulator base 32 may each be equal to the length (depth) L1 of each first through-groove 41U from the second end face 32e of the insulator base 32.

The positional relationship in the axial direction in the connecting wires 271U, 271V, and 271W of the three phases may be changed as necessary.

The extending grooves 43W may be omitted from each third through-groove 41W. In the present embodiment, the third through-grooves 41W each communicate with the third guide groove 51W exclusively. Therefore, even without the extending grooves 43W, each W-phase connecting wire 271W cannot be arranged in the guide grooves 51U, 51V, instead of the third guide groove 51W in which the W-phase connecting wire 271W should be disposed correctly.

Both insulators 31 may have the first to third through-grooves 41U, 41V, and 41W and the first to third guide grooves 51U, 51y, and 51W. For example, the conductive wires 26 of the three phases which extend through the first to third through-grooves 41U, 41V, and 41W respectively of one of the two insulators 31 are wound around the corresponding teeth 23 first to form the coils 27U, 27V, and 27W. Thereafter, the conductive wires 26 of the three phases may be drawn respectively from the first to third through-grooves 41U, 41V, and 41W of the other one of the two insulators 31.

A connecting wire extending from the winding-end section of a first coil, which is one of any circumferentially adjacent two of the coils of the same phase, may be electrically connected to a connecting wire extending from the winding-start section of a second coil, which is the other one of the adjacent coils, through a power supply terminal. Also, the winding-start section of the first coil and the winding-end section of the second coil may be electrically connected to each other at a neutral-point-joining section. That is, the coils 27U, 27V, 27W of the respective phases may be provided by parallel winding.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A stator for a rotating electrical machine, comprising:
a stator core having an annular yoke and a plurality of teeth extending in a radial direction from an inner circumferential surface of the yoke;
two insulators disposed on opposite end faces in an axial direction of the stator core, wherein
  each of the insulators includes
    an annular insulator base that contacts the yoke, and
    a plurality of insulator extending portions that extend in the radial direction from an inner circumferential surface of the insulator base and respectively contact the teeth, and
  the insulator base has a first end face that contacts the yoke and a second end face opposite to the first end face in the axial direction; and
a plurality of conductive wires that form a plurality of coils by being wound around the teeth and the insulator extending portions, wherein
at least one of the insulators includes
  a plurality of guide grooves that extend in a circumferential direction in an outer circumferential surface of the insulator base and thus guide the corresponding conductive wires in the circumferential direction, and
  a plurality of through-grooves that extend in the radial direction through the insulator base and open in the second end face of the insulator base in a manner dividing at least one of the guide grooves in the circumferential direction,
the through-grooves include at least two first grooves each of which divides at least two of the guide grooves, wherein each of the first grooves has a recess that is recessed in the circumferential direction with respect to the rest of the first groove at a portion that divides one of the at least two guide grooves divided by the first groove, and
the conductive wires extending through the corresponding through-grooves and outward in the radial direction of the insulator base are guided in the circumferential direction by the corresponding guide grooves, and the conductive wires extend through the recesses in the corresponding first grooves, wherein
each of the conductive wires includes a connecting wire that connects two of the coils of a same phase that are closest to each other in the circumferential direction,
the connecting wire passes through two of the through-grooves and extends in the section of the guide groove between the two through-grooves, and
the connecting wire extends through the recess in the first groove.

2. The stator according to claim 1, wherein the recess of each first groove is recessed to the opposite sides in the circumferential direction with respect to the rest of the first groove.

3. A rotating electrical machine comprising:
a rotor; and
the stator according to claim 1.

* * * * *